(12) United States Patent
Wei et al.

(10) Patent No.: US 11,917,436 B2
(45) Date of Patent: *Feb. 27, 2024

(54) BEAM FAILURE DETECTION AND RECOVERY

(71) Applicant: FG Innovation Company Limited, Tuen Mun (HK)

(72) Inventors: Chia-Hung Wei, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,281

(22) Filed: Mar. 7, 2023

(65) Prior Publication Data

US 2023/0209379 A1 Jun. 29, 2023

Related U.S. Application Data

(63) Continuation of application No. 17/244,092, filed on Apr. 29, 2021, now Pat. No. 11,706,647, which is a continuation of application No. 16/843,113, filed on Apr. 8, 2020, now Pat. No. 11,026,109, which is a continuation of application No. 16/297,631, filed on Mar. 9, 2019, now Pat. No. 10,659,983.

(60) Provisional application No. 62/651,842, filed on Apr. 3, 2018, provisional application No. 62/640,696, filed on Mar. 9, 2018.

(51) Int. Cl.
*H04W 24/08* (2009.01)

(52) U.S. Cl.
CPC ................... *H04W 24/08* (2013.01)

(58) Field of Classification Search
None
See application file for complete search history.

(56) References Cited

U.S. PATENT DOCUMENTS

2019/0166555 A1 5/2019 Cheng et al.
2019/0173740 A1 6/2019 Zhang et al.
(Continued)

OTHER PUBLICATIONS

Ericsson, "BWP impact to RLM configuration (E396)", 3GPP TSG-RAN WG2 #101 Athens, Greece, Feb. 26-Mar. 2, 2018, R2-1802780.

(Continued)

*Primary Examiner* — Christine T Duong
(74) *Attorney, Agent, or Firm* — ScienBiziP, P.C.

(57) ABSTRACT

A base station (BS) and a method for wireless communication are provided. The method includes transmitting a first radio resource control (RRC) configuration that configures a radio link monitoring configuration that includes a beam failure detection (BFD) timer and a beam failure indication (BFI) count threshold. The first RRC configuration enables a user equipment (UE) to: start or restart the BFD timer by a medium access control (MAC) entity of the UE each time a BFI is received from a lower layer; and initiate a beam failure recovery (BFR) procedure upon determining that the number of the received BFIs is greater than or equal to the BFI count threshold. The method further includes transmitting a second RRC configuration that reconfigures the radio link monitoring configuration. The second RRC configuration enables the UE to set the BFI counter to zero in response to receiving the second RRC configuration.

10 Claims, 7 Drawing Sheets

(56) References Cited

U.S. PATENT DOCUMENTS

| | | |
|---|---|---|
| 2019/0200395 A1 | 6/2019 | Agiwal |
| 2019/0215870 A1 | 7/2019 | Babaei et al. |
| 2019/0253949 A1 | 8/2019 | Park et al. |
| 2019/0274169 A1 | 9/2019 | Tsai et al. |
| 2019/0373480 A1 | 12/2019 | Go et al. |
| 2020/0328796 A1* | 10/2020 | Turtinen ............... H04W 76/28 |

OTHER PUBLICATIONS

Notice of Allowance dated Mar. 10, 2020 for U.S. Appl. No. 16/297,631 which is the family application of the instant application.

Non-Final Rejection dated Sep. 25, 2020 for U.S. Appl. No. 16/843,113 which is the family application of the instant application.

Notice of Allowance dated Jan. 29, 2021 for U.S. Appl. No. 16/843,113 which is the family application of the instant application.

Non-Final Rejection dated Jul. 29, 2022 for U.S. Appl. No. 17/244,092 which is the parent application of the instant application.

Notice of Allowance dated Dec. 7, 2022 for U.S. Appl. No. 17/244,092 which is the parent application of the instant application.

\* cited by examiner

FIG. 1

The MAC entity shall:

1> if beam failure instance indication has been received from lower layers:

2> start or restart the *BFD Timer*;

2> increment *BFI COUNTER* by 1;

2> if *BFI COUNTER* = $M_{BFD}$ + 1:

3> initiate a Random Access procedure with the BFR specific parameters configured       3> indicates lower layer to stop indicating BFD indication 1> if the *BFD Timer* expires:

2> set *BFI COUNTER* to 0.

1> if the Random Access procedure is successfully completed:

2> consider the Beam Failure Recovery Request procedure successfully completed.

BEAM FAILURE DETECTION AND RECOVERY

CROSS REFERENCE TO RELATED APPLICATIONS

This application is a continuation application of U.S. patent application Ser. No. 17/244,092 filed on Apr. 29, 2021, which is a continuation application of U.S. patent application Ser. No. 16/843,113 filed on Apr. 8, 2020, which is a continuation application of U.S. patent application Ser. No. 16/297,631 filed on Mar. 9, 2019, which claims the benefit of and priority to U.S. Provisional Patent Application Ser. No. 62/640,696 filed on Mar. 9, 2018 and U.S. Provisional Patent Application Ser. No. 62/651,842 filed on Apr. 3, 2018. The contents of all above-named applications are fully incorporated herein by reference for all purposes.

FIELD

The present disclosure generally relates to a procedure for beam failure recovery performed by a user equipment and a user equipment performing the same.

BACKGROUND

In New Radio (NR), a beam failure recovery (BFR) procedure is introduced for a user equipment (UE) to indicate a serving gNB of a new synchronization signal block (SSB) or a new channel state information reference signal (CSI-RS) when beam failure is detected on the serving SSB(s) and/or CSI-RS(s). The BFR procedure is performed via a beam failure detection procedure that works to count beam failure indications received from the lower sublayer(s) to Medium Access Control (MAC) entity.

Moreover, carrier aggregation (CA) is supported in NR and it is assumed that the Primary Cell (PCell) is deployed in Sub 6 GHz (FR1) which can achieve reliable control information transmission while Secondary Cell (SCell) is deployed in above 6 GHz (FR2) which can achieve high throughput. In order to resolve beam blockage (e.g., beam failure) which happened more often in FR2, the BFR is needed to be supported in both PCell and SCell. But, how to efficiently handle the beam failure detection and beam failure recovery procedures among multiple cells (e.g., both PCell and SCell) within a single MAC entity is a challenge. Especially, if a MAC entity receives a request for initiating a new beam failure recovery procedure while another is already ongoing in the MAC entity, it is up to UE implementation whether to continue with the ongoing procedure or start with the new procedure. Hence, during the beam failure detection performed among multiple cells which associated to a single MAC entity for carrier aggregation, it is possible that multiple random access procedures could be requested by the triggered BFRs among the multiple cells, and additional random access procedure(s) could be triggered while one random access procedure has been triggered and currently ongoing.

SUMMARY

The present disclosure is directed to a beam failure recovery procedure, in particular, to achieve a more efficient beam failure detection and beam failure recovery procedure.

In a first aspect of the present disclosure, a base station (BS) for wireless communication is provided. The BS includes one or more processors and at least one memory coupled to at least one of the one or more processors, the at least one memory storing computer-executable instructions that, when executed by the at least one of the one or more processors, cause the BS to: transmit, to a user equipment (UE), a first radio resource control (RRC) configuration, the first RRC configuration configuring a radio link monitoring configuration that includes a beam failure detection (BFD) timer and a beam failure indication (BFI) count threshold. The first RRC configuration enables the UE to: start or restart the BFD timer by a medium access control (MAC) entity of the UE each time a BFI is received from a lower layer of the UE; count a number of the received BFIs using a BFI counter; and initiate a beam failure recovery (BFR) procedure upon determining that the BFI counter indicates a value greater than or equal to the BFI count threshold. The computer-executable instructions, when executed by the at least one of the one or more processors, further cause the BS to transmit, to the UE, a second RRC configuration that reconfigures the radio link monitoring configuration. The second RRC configuration enables the UE to set the BFI counter to zero in response to receiving the second RRC configuration.

In an implementation of the first aspect, the second RRC configuration is transmitted via a downlink RRC message.

In another implementation of the first aspect, the second RRC configuration reconfigures the BFI count threshold.

In another implementation of the first aspect, the second RRC configuration reconfigures the BFD timer.

In another implementation of the first aspect, both the first RRC configuration and the second RRC configuration are associated with a specific downlink bandwidth part (BWP).

In a second aspect of the present disclosure, a method performed by a BS for wireless communication is provided. The method includes transmitting, to a UE, a first RRC configuration, the first RRC configuration configuring a radio link monitoring configuration that includes a BFD timer and a BFI count threshold. The first RRC configuration enables the UE to: start or restart the BFD timer by a MAC entity of the UE each time a BFI is received from a lower layer of the UE; count a number of the received BFIs using a BFI counter; and initiate a BFR procedure upon determining that the BFI counter indicates a value greater than or equal to the BFI count threshold. The method further includes transmitting, to the UE, a second RRC configuration that reconfigures the radio link monitoring configuration. The second RRC configuration enables the UE to set the BFI counter to zero in response to receiving the second RRC configuration.

In a third aspect of the present disclosure, a UE for wireless communication is provided. The UE includes one or more processors and at least one memory coupled to at least one of the one or more processors, the at least one memory storing computer-executable instructions that, when executed by the at least one of the one or more processors, cause the UE to: receive a first RRC configuration, the first RRC configuration configuring a radio link monitoring configuration that includes a BFD timer and a BFI count threshold; start or restart the BFD timer by a MAC entity of the UE each time a BFI is received from a lower layer; count a number of the received BFIs using a BFI counter; initiate a BFR procedure upon determining that the BFI counter indicates a value greater than or equal to the BFI count threshold; and set the BFI counter to zero in response to receiving a second RRC configuration that reconfigures the radio link monitoring configuration.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The description uses the phrases "in one embodiment," "in one implementation," "in some implementations," or "in some embodiments," which may each refer to one or more of the same or different embodiments. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

It is noted that the term "and/or" includes any and all combinations of one or more of the associated listed items. It will also be understood that, although the terms first, second, third etc. may be used herein to describe various elements, components, regions, parts, and/or sections, these elements, components, regions, parts, and/or sections should not be limited by these terms. These terms are only used to distinguish one element, component, region, part, or section from another element, component, region, layer, or section. Thus, a first element, component, region, part, or section discussed below could be termed a second element, component, region, layer, or section without departing from the teachings of the present disclosure.

It should be noted that, in the present disclosure, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, a personal digital assistant (PDA), or a television display with wireless communication capability. The UE is configured to receive and transmit signals over an air interface to one or more cells in a radio access network.

A base station may include, but is not limited to, a node B (NB) as in a Universal Mobile Telecommunication System (UMTS), an evolved node B (eNB) as in Long-Term Evolution Advanced (LTE-A), a radio network controller (RNC) as in the UMTS, a base station controller (BSC) as in Global System for Mobile Communication/GSM EDGE Radio Access Network (GSM/GERAN), a next generation eNB (ng-eNB) as a node providing Evolved Universal Terrestrial Radio Access (E-UTRA) user plane and control plane protocol terminations towards the UE and connected via the NG interfaces to the 5G core network (5GC), a next generation node B (gNB) as in the 5G Access Network (5G-AN), and any other apparatus capable of controlling radio communication with cellular positioning technology and managing radio resources within a cell. The base station may connect to serve the one or more UEs through a radio interface to the network. A base station, a cell, a gNB, and a gNB/cell may be used interchangeably hereinafter.

In a beam failure recovery (BFR) procedure, Physical (PHY) sublayer sends beam failure indications (BFIs) to a MAC entity if certain beam measurement criteria are satisfied. A beam failure indication (BFI) counter (e.g., BFI_COUNTER) is used by the MAC entity to count a number of beam failure indications received from PHY sublayer. When the BFI_COUNTER reaches a certain value/threshold (e.g., a max number of beam failure indications, $M_{BFI}$), the MAC entity triggers a beam failure recovery by performing a corresponding random access procedure that follows instructions and uses parameters contained in a specific information element (IE) such as beam failure recovery configuration (e.g., BeamFailureRecoveryConfig) carried in a specific radio resource control (RRC) message sent by gNB. It is noted that the specific RRC message mentioned within this disclosure may include, but is not limited to, RRCReconfiguration, RRCResume, RRCReestablishment, RRCSetup, or any other downlink unicast RRC message. The MAC entity sets up a beam failure detection (BFD) timer for resetting the BFI counter. It is noted that the timer can be implemented as starting from an initial value and then running all the way down to 0. When the timer reaches to 0, the timer is treated as expired. The timer can also be implemented as reversely running which starts from 0 and then runs all the way up to a specific value. In this reversely running case, the timer is treated as expired when the timer reaches the specific value. Either the initial value and the specific value is configured by the gNB via the specific RRC message. Both of the initial value and the specific value can be represented as $M_{BFD}$ afterward within this disclosure.

No matter which of the implementation options was taken, the time interval from starting time of the timer to the expiring time of the timer is equal to the $M_{BFD}$. The BFD Timer running behaviors as shown in all figures are exemplary embodiments of the present disclosure. The BFD timer is (re)started upon every new reception of the BFI. When the BFD timer expires, MAC entity resets the BFI counter. It is noted that a BFI count threshold ($M_{BFI}$) and $M_{BFD}$ may be configured by gNB via a specific IE such as radio link monitoring configuration (e.g., RadioLinkMonitoringConfig) carried in a specific RRC message.

It is noted that the beam mentioned within this disclosure is equivalent to a spatial (domain) filtering. For an example, the spatial filtering is applied in analog domain by adjusting phase and/or amplitude of the signal before being transmitted by a corresponding antenna element. For another example, the spatial filtering is applied in digital domain by multi-input multi-output (MIMO) technique in a wireless communication system. Therefore, a physical uplink shared channel (PUSCH) transmission made by a UE using a specific beam means a PUSCH transmission using a specific spatial filtering technique, made by a UE, in analog/digital domain. The beam may be formed by, but not limited to, an antenna, an antenna port, an antenna element, a group of antennas, a group of antenna ports, or a group of antenna elements. The beam may be alternatively made with a certain reference signal resource. The beam may be equivalent to a spatial domain filtering by which an electromagnetic (EM) radiation is transmitted.

Figure 1:
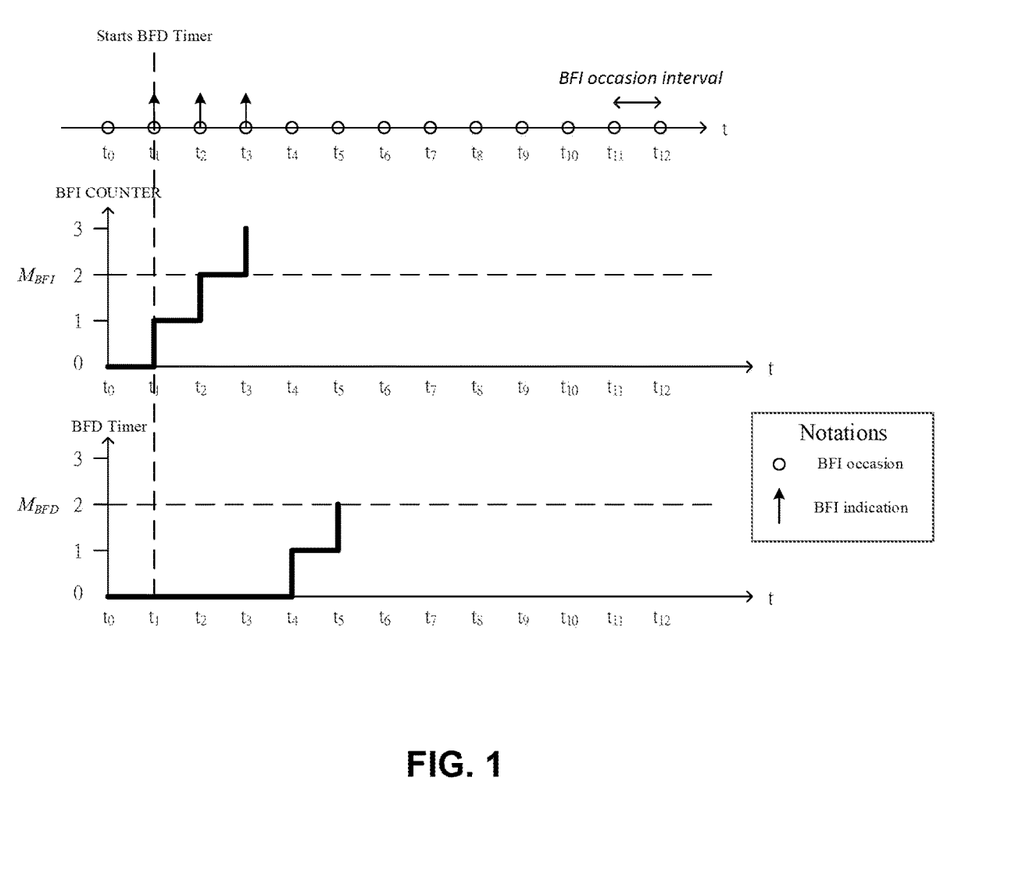
FIG. 1 is a diagram illustrating operations for beam failure detection (BFD) timer and beam failure indication (BFI) counter according to one embodiment of the present disclosure.

FIG. 1 illustrates a diagram of operations for the BFD timer and BFI counter operations configured for a UE. In FIG. 1, BFI_COUNTER increases by 1 when a beam failure indication (BFI) is received from PHY sublayer at time $t_1$; at the same time $t_1$, the BFD timer starts from 0. At time $t_2$, BFI_COUNTER increases by additional 1 since a beam failure indication is still received from PHY sublayer; at the same time $t_2$, the BFD timer re-starts from 0. Once the BFI COUNTER exceeds a threshold $M_{BFI}$ ($M_{BFI}$ equals to 2 in this case) at time $t_3$, MAC entity triggers a random access procedure for beam failure recovery. At $t_3$, the BFD timer re-starts again from 0 due to the reception of a beam failure indication. If the UE no longer receives BFIs, the BFD timer increases by 1 at each subsequent time points (at $t_4$ and $t_5$) until it reaches a max BFD value (e.g., $M_{BFD}$ equals to 2 in this case) to expire. It is noted that FIG. 1 illustrates reversely running behavior of the BFD timer according to one embodiment of the present disclosure. The running behavior of the BFD timer that starts from an initial value down to zero may be applied according to another embodiment of the present disclosure.

To avoid random access procedure repeatedly triggered and to achieve efficient coordination of BFI counter and BFD timer behavior, a conditional random access procedure for beam failure recovery is provided.

In one embodiment of the present disclosure, the UE may be configured with multiple bandwidth parts (BWPs) and operate with one active BWP at one time according to configuration information specific to that active BWP (e.g., RadioLinkMonitoringConfig and/or BeamFailureRecoveryConfig). The active BWP may switch among the configured BWPs; therefore, the gNB configures the UE with a respective configuration information specific to one BWP before the BWP is activated. The configuration information specific to the BWP may be received by the UE via a downlink RRC message. The BWP specific configuration information includes configuration of BFI count threshold (e.g., $M_{BFI}$) and an initial value of BFD timer. The BFI counter may be initiated or reset to zero when a reconfiguration information (e.g., RadioLinkMonitoringConfig and/or BeamFailureRecoveryConfig) are received. The reconfiguration information is sent for updating/reconfiguring BFI count threshold and/or updated BFD timer (e.g., update of the configuration of the initial value to BFD timer and/or configuration of the BFI count threshold). Alternatively, the BFI counter may be initiated or reset to zero before indicating to lower sublayer to start the beam failure indication transmission, and beam failure corresponding reference signal measurement procedure for the specific BWP (e.g., initial BWP). And, the beam failure detection (BFD) procedure, beam failure indication transmission, and beam failure corresponding reference signal measurement for each active BWP can be activated either directly after the corresponding serving cell is activated, an explicit signaling, for example, a MAC Control Element (MAC CE), or an indication from a lower sublayer which received a specific downlink control indicator (DCI).

Since the initial BWP of the corresponding serving cell is activated directly after the corresponding serving cell is activated, the BFD procedure within the initial BWP may be activated directly after the corresponding serving cell is activated. And, the BFD procedure within the remaining BWPs except the initial BWP of the corresponding serving cell may be activated only after being triggered by, for example, a MAC CE or DCI.

In addition, when BWP is switching, the BFI counter value and BFD timer value may be reset to zero before receiving the activation/deactivation of BFR procedure. The UE will reset the BFI counter and/or BFD timer and enable the lower sublayer to send a BFI indication while the BWP is switching (e.g., no waiting for activation/deactivation command).

Figure 2:
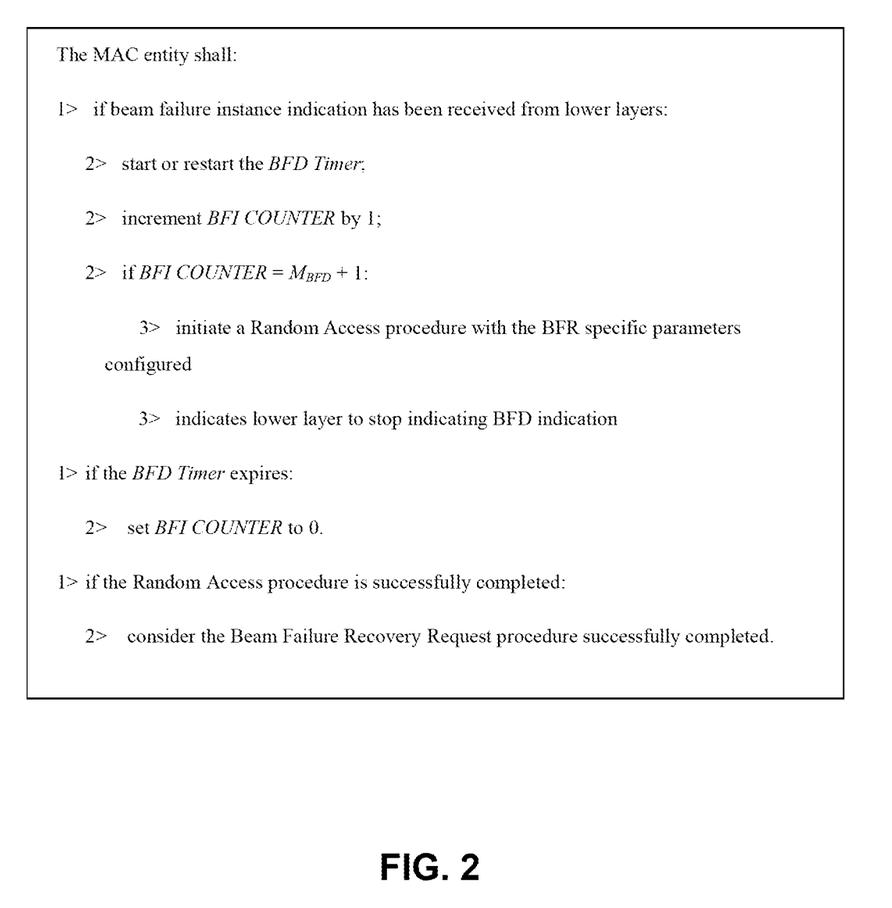
FIG. 2 is a diagram illustrating a procedure of stopping BFD indication according to one embodiment of the present disclosure.

To avoid duplicated triggering of random access for beam failure recovery, the beam failure detection may be stopped once the BFR procedure is triggered. In one embodiment, the MAC entity indicates PHY to stop indicating the BFD indication to the MAC entity. In another embodiment, the MAC entity may request PHY to stop measuring the reference signal configured for beam failure detection. FIG. 2 illustrates a procedure of stopping BFD indication according to one embodiment of the present disclosure.

Figure 3:
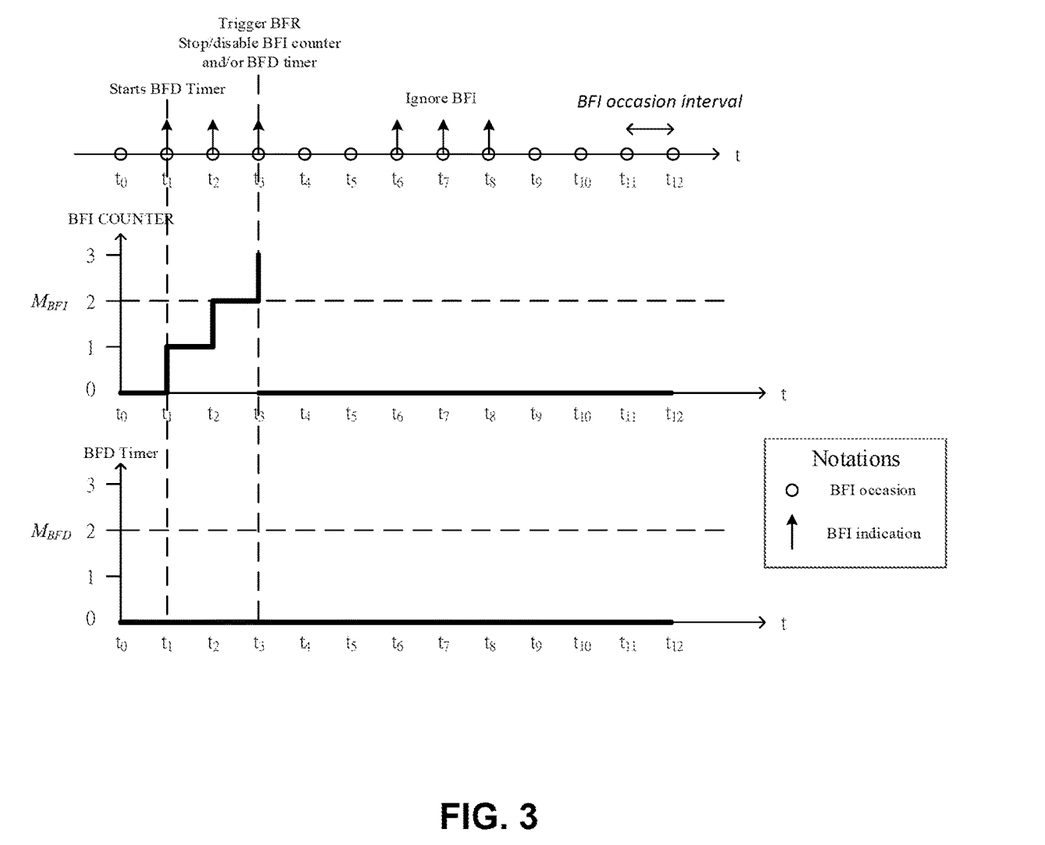
FIG. 3 is a diagram illustrating operations for beam failure detection (BFD) timer and beam failure indication (BFI) counter according to one embodiment of the present disclosure.

In one embodiment, MAC entity stops the running of the BFD timer and/or stops the BFI counter counting BFIs by resetting or disabling them. PHY may keep sending the BFIs to the MAC entity if beam failure is detected continuously, and the MAC entity may ignore the reception of BFIs or disable the BFD timer. In FIG. 3, at time $t_3$, the number of BFIs received by the MAC entity exceed $M_{BFI}$ and a random access procedure for the BFR is triggered correspondingly. The MAC entity receives additional BFIs continuously at time $t_6$, $t_7$, and $t_8$, but the BFI counter may be stopped or disabled such that MAC entity ignores the reception of additional BFIs, avoiding duplicated triggering of random access for the BFR.

Alternatively, once the random access for the BFR is triggered at time $t_3$, the beam failure detection is stopped or disabled so that the BFD timer would not be re-started upon the reception of BFIs at time $t_6$. Therefore, by stopping/disabling beam failure detection once a random access for BFR is triggered, the duplicated trigger of random access may be prevented.

Also, the MAC entity may directly withdraw the BFIs from PHY when there is an ongoing random access procedure for a BFR. The MAC entity may resume the process of handling BFI notification until the BFR is successfully completed.

It is noted that above-mentioned embodiments may be applied for BFR upon PCell and/or SCell where the stop of beam failure detection is per component carrier (CC).

Figure 4:
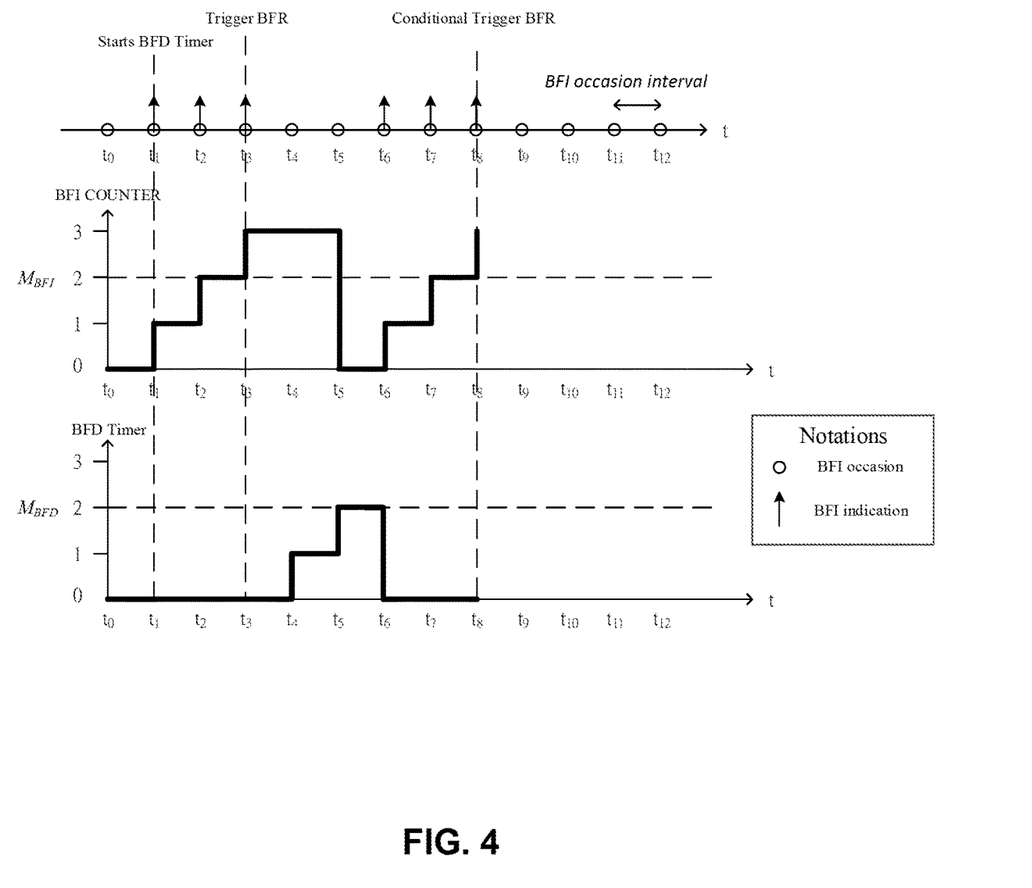
FIG. 4 is a diagram illustrating operations for beam failure detection (BFD) timer and beam failure indication (BFI) counter according to one embodiment of the present disclosure.

In one embodiment, the MAC entity may keep receiving the BFIs (processing BFI notifications) from PHY, keeps counting the BFI by BFI counter, and keeps running of the BFD timer once the BFR procedure is performed. Once the BFD timer expires and/or the BFI counter exceeds the BFI count threshold during the ongoing random access procedure triggered for BFR, the MAC entity triggers a specific procedure for response. In FIG. 4, a beam failure recovery has been performed at time $t_3$ where the number of the received BFIs counted by the BFI COUNTER exceeds the count threshold $M_{BFI}$. After $t_3$, the condition for triggering another beam failure recovery is satisfied at time $t_8$ while the BFR procedure having been triggered at $t_3$ is still ongoing. In the embodiment, the MAC entity may skip triggering another random access procedure for the BFR at $t_8$.

Alternatively, after $t_3$, the condition for triggering another beam failure recovery is satisfied at time $t_8$ while the BFR procedure having been triggered at $t_3$ is still ongoing. The MAC entity may trigger a conditional BFR procedure at $t_8$ by applying a specific set of random access parameter(s) different from the random access procedure triggered at $t_3$ and/or may trigger a conditional BFR procedure at $t_8$ on a different physical random access channel (PRACH) resource from the random access procedure triggered at t3.

Alternatively, the MAC entity may cancel the currently ongoing beam failure recovery procedure by stopping the corresponding ongoing random access procedure if the BFI counter is reset, if the BFD timer expires at $t_5$, or if the BFD timer reaches a specific threshold. In FIG. 4, a random access procedure for a BFR is triggered at time $t_3$. The specific threshold is different from $M_{BFD}$ and may be configured for reset of the BFI counter. The specific threshold is another threshold configured by gNB for determination whether to cancel the ongoing beam failure recovery procedure.

The ongoing random access performed for the BFR may be stopped by several alternatives at different stages during random access procedure. For example, MAC entity may stop random access procedure by stopping random access preamble transmission, stopping message 3 transmission, ignoring information received for random access response, or ignoring information upon the reception of message 4. Moreover, there are two sub-stages during the preamble transmission: "Random Access Resource Selection" and "Random Access Response Reception." Before each random access preamble (re)transmission, the MAC entity may check whether the BFD timer expires.

If random access procedure triggered for BFR is a contention-based random access, the MAC entity may check whether the BFD timer expires before each message 3 (re)transmission. The message 3 (re)transmission is to transmit a radio resource control (RRC) message after the UE receives a random access response in reply to the preamble transmission.

Alternatively, the MAC entity may stop monitoring random access response (RAR) sent from gNB in reply to the preamble (re)transmission for stopping the ongoing random access procedure for the BFR. The MAC entity may ignore information/instruction contained in the RAR the UE received.

Alternatively, the MAC entity may stop monitoring message 4 transmission sent from gNB in reply to message 3 transmission (e.g., RRCConnectionRequest) for stopping the ongoing random access procedure for the BFR. The message 4 is an RRC accept message transmitted from gNB to the UE in reply to the message transmission from the UE.

Alternatively, the MAC entity may keep monitoring message 4 transmission and follow information/instruction contained in the message 4 only if the contention resolution is successfully completed (e.g., the message 4 is scrambled by the UE's identity). However, if the message 4 is not received or message 4 is received but the contention resolution is not successfully completed (e.g., the message 4 is not scrambled by the UE's identity), the MAC entity may stop message 4 retransmission.

While a UE is configured with carrier aggregation (CA), the UE is also configured with respective cell specific configuration information (e.g., RadioLinkMonitoringConfig and/or BeamFailureRecoveryConfig) by a gNB for each configured serving cell. For CA, a single MAC entity of the UE may handle data scheduling of multiple cells associated to the MAC entity. Therefore, the random access procedure for beam failure recovery may be performed by the MAC entity among multiple serving cells (e.g., PCell/SpCell and SCell).

Figure 5:
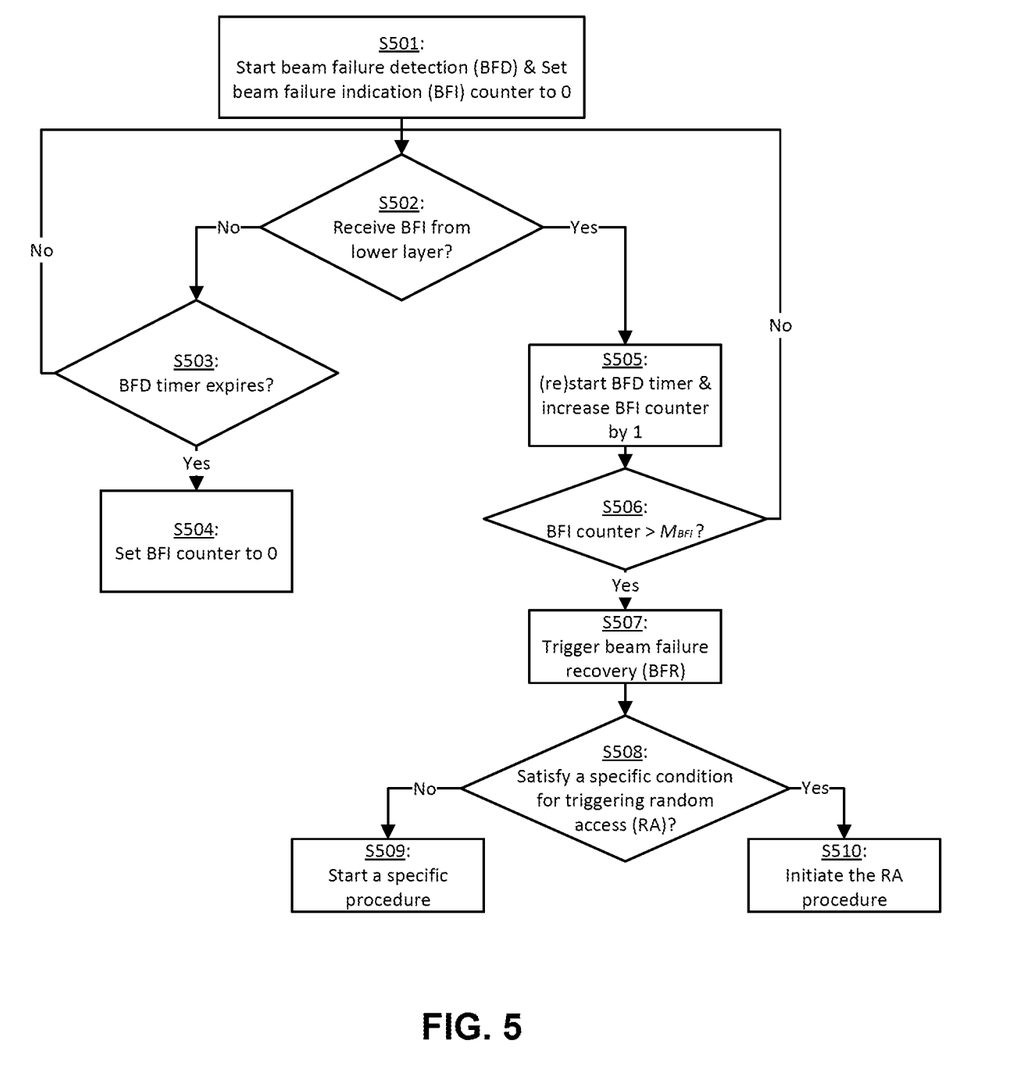
FIG. 5 is a decision flow chart for a UE to perform a conditional random access procedure for a beam failure recovery according to one embodiment of the present disclosure.

FIG. 5 is a decision flow chart for a UE to perform a conditional random access procedure for a beam failure recovery according to one embodiment of the present disclosure. In FIG. 5, once the value of the BFI counter is higher than $M_{BFI}$, MAC entity initiates beam failure recovery by triggering a random access procedure only when certain specific condition is satisfied. Otherwise, MAC entity may trigger another specific procedure for beam recovery.

At action S501, the UE starts a beam failure detection and sets a BFI counter to zero. At action S502, the UE detects if receiving beam failure indications (BFIs) from PHY. At action S503, the UE determines an expiration of a beam failure detection (BFD) timer that has been started at a time of no BFI being received from a lower sublayer. At action S504, the UE resets the BFI counter to zero if the BFD timer expires. At action S505, the UE starts or restarts the beam failure detection (BFD) timer and counts a number of received BFI(s) by increasing the BFI counter by one when receiving a BFI. At action S506, the UE determines whether the value of the BFI counter exceeds a BFI count threshold $M_{BFI}$ (the counted number of the received BFIs is larger than $M_{BFI}$). At action S507, the UE initiates a beam failure recovery (BFR) if the value of the BFI counter exceeds $M_{BFI}$. Once the BFR is initiated, the UE further checks whether a specific condition is satisfied to trigger a corresponding random access procedure for the BFR at action S508. If the specific condition is satisfied, the corresponding random access procedure is triggered at action S510; if the condition is not satisfied, the UE starts another specific procedure for the BFR at action S509.

There are various conditions which can be configured for triggering a corresponding random access when one of these conditions is satisfied in response to a beam failure recovery.

In one embodiment, there is no random access procedure triggered by BFR ongoing in the same and/or the other serving cell.

In one embodiment, there is no contention-based random access procedure triggered by BFR ongoing in the same and/or other serving cell.

In one embodiment, there is no ongoing contention-free random access procedure triggered by BFR in the same and/or other serving cell.

In one embodiment, BFR is triggered in SCell while there is no ongoing random access procedure triggered by BFR ongoing in PCell/SpCell.

In one embodiment, BFR is triggered in SCell while there is no ongoing contention-free random access procedure triggered by BFR ongoing in PCell/SpCell.

In one embodiment, BFR is triggered in SCell while there is no ongoing contention-based random access procedure triggered by BFR in the same and/or other serving cell.

In one embodiment, BFR is triggered in SCell while there is no ongoing contention-free random access procedure triggered by BFR in PCell/SpCell, and the SCell is configured with contention-free random access resource for the BFR in SCell.

In one embodiment, BFR is triggered in PCell/SpCell while there is no ongoing contention-free random access procedure triggered by BFR ongoing in SCell, and the PCell is configured with contention-free random access resource for the BFR in PCell/SpCell.

In one embodiment, there is no random access procedure triggered by BFR ongoing in the same BFR-group, where the BFR-group is a group of multiple serving cells configured by the gNB for the purpose of sharing random access resource, joint detecting beam failure, and/or joint beam failure recovery/reporting.

In one embodiment, there is no random access procedure triggered by a specific BFR that is ongoing.

In one embodiment, the specific BFR may be a BFR which is triggered by a BFD which monitors a same set of CSI-RS, CSI-RS-Index, SSB, SSB-Index, and/or UE/Cell/BWP/beam specific reference signal as the BFD of the new triggered BFR.

In one embodiment, the specific BFR can be a BFR which tends to recover/indicate to the gNB a same SSB, SSB-Index as the new triggered BFR.

In one embodiment, if there is no other ongoing random access procedure triggered by BFR that is triggered and not finished.

The condition for triggering a conditional random access for BFR may include, but is not limited to, those mentioned above.

In one embodiment, once BFR is triggered in PCell/SpCell while there is an ongoing random access procedure triggered by BFR ongoing in SCell, the MAC entity triggers a new random access procedure for the new triggered BFR and cancels the ongoing random access procedure for the original triggered BFR.

In one embodiment, the MAC entity can conditionally initiate a random access procedure for the new triggered BFR by considering the purpose of the ongoing random access. Since the random access procedure for BFR is more urgent than the random access for others purposes (e.g., system information request), it is better to allow the random access for the BFR to be initiated even when there is another ongoing random access for other purpose(s), and the MAC entity should cancel the ongoing random access for other purposes. This kind of determination can further extend to more embodiments. For examples, the UE may make a decision based on the BWP ID or serving cell ID or the combination of these rules or joint consideration of these rules if the random access for the BFR has same purpose and/or BWP ID and/or serving cell ID as the ongoing random access.

In one embodiment, the SCell applied for BFR belongs to a different timing advanced group (TAG), and it is allowed to have a parallel random access process upon different PRACH resources for BFR.

Once the specific condition is not satisfied, a certain specific procedure may be initiated by the UE.

In one embodiment, a joint beam failure recovery may be applied with the ongoing random access procedure triggered by another BFR. The joint beam failure recovery may include a step of the UE that explicitly or implicitly indicates gNB which new beam the UE would like to recover by a specific MAC control element via a non-failure cell or by selecting a pre-configured random access channel resource which has implicit mapping to a corresponding beam.

In one embodiment, a new random access procedure for the new triggered BFR may be triggered and the ongoing random access procedure for the original triggered BFR may be cancelled.

In one embodiment, the newly triggered BFR is simply cancelled directly.

Furthermore, the MAC entity of the UE may handle the conflict of initiating multiple random access procedures due to the multiple triggered BFRs by conditional triggered BFR. Once the value of the BFI counter in the MAC entity of the UE is higher than $M_{BFI}$, the MAC entity needs to check specific condition(s) before triggering a corresponding BFR procedure. It means that a BFR is triggered only when specific condition(s) is satisfied. Otherwise, the MAC entity will trigger another specific procedure (s).

Figure 6:
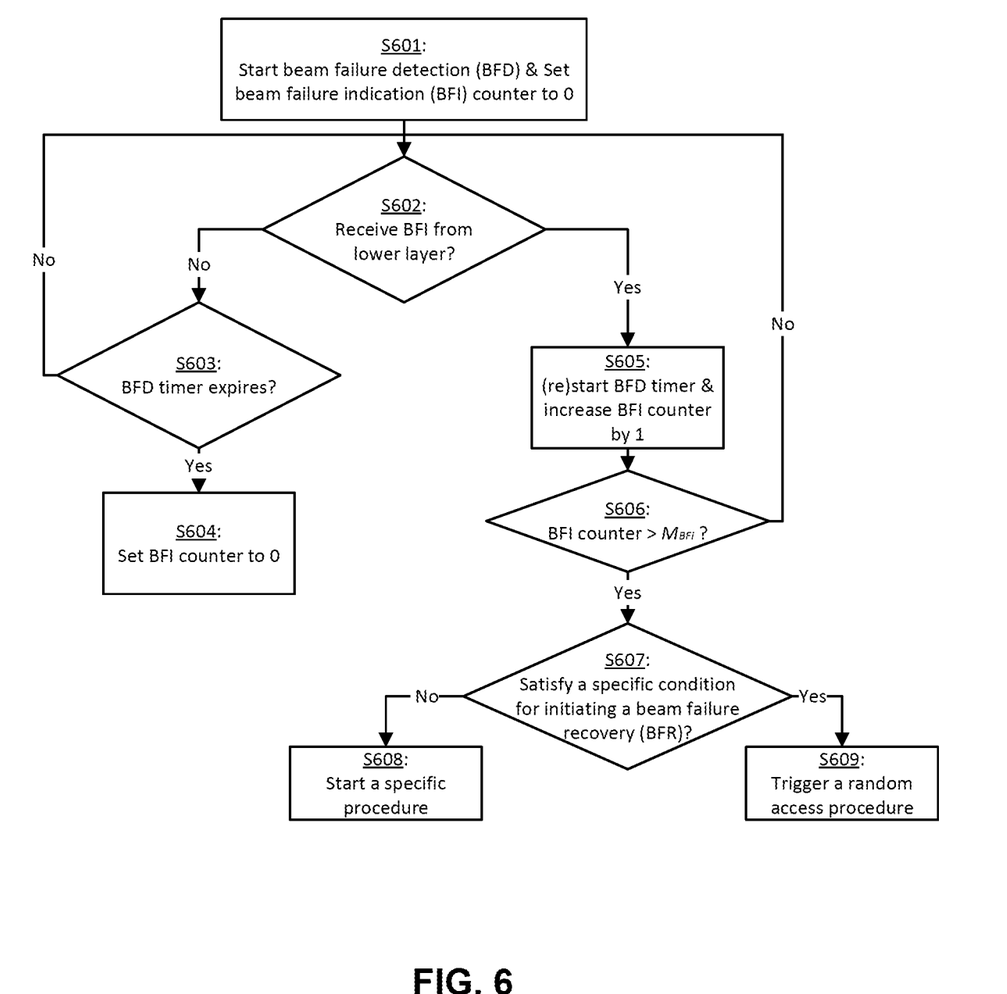
FIG. 6 is a decision flow chart for a UE to perform a conditional beam failure recovery according to one embodiment of the present disclosure.

FIG. 6 is a decision flow chart for a UE to perform a conditional beam failure recovery according to one embodiment of the present disclosure. In FIG. 6, once the value of the BFI counter is higher than $M_{BFI}$, the MAC entity initiates a conditional beam failure recovery only when certain a specific triggering condition is satisfied. Otherwise, the MAC entity may trigger another specific procedure for beam failure recovery.

At action S601, the UE starts a beam failure detection and sets a BFI counter to zero. At action S602, the UE detects if receiving beam failure indication (BFIs) from PHY. At action S603, the UE determines an expiration of a beam failure detection (BFD) timer that has been started at a time of no BFI being received from a lower sublayer. At action S604, the UE resets the BFI counter to zero if the BFD timer expires. At action S605, the UE starts or restarts the beam failure detection (BFD) timer and counts a number of received BFI(s) by increasing the BFI counter by one when receiving a BFI. At action S606, the UE determines whether the value of the BFI counter exceeds a BFI count threshold $M_{BFI}$ (the counted number of the received BFIs is larger than $M_{BFI}$). At action S607, the UE checks whether a specific condition is satisfied to initiate a beam failure recovery (BFR) if the value of the BFI counter exceeds $M_{BFI}$. If the specific condition is satisfied, the corresponding random access procedure is triggered for the conditionally initiated BFR at action S609; if the condition is not satisfied, the UE starts another specific procedure for the BFR at action S608.

There are various conditions which can be configured for determining whether to initiate a conditional beam failure recovery before triggering a random access procedure.

In one embodiment, if the BFI counter of another serving cell is above a specific threshold (e.g., it implicitly represents that the link condition upon the other cell is unstable), it is better to recover the corresponding beam on the SCell.

In one embodiment, the condition includes if the SCell is operating at specific frequency. For instance, if SCell is operated at FR2 (Frequency Range 2) and PCell is operated at FR1 (Frequency Range 1), then it would probably be feasible to stop the beam management in SCell while it is failed. Note that FR1 refers to sub-6 GHz (450 MHz-6000 MHz) and FR2 refers to mmWave (24250 MHz-52600 MHz).

In one embodiment, the condition includes if the configured/established DRB (Dedicated Radio Bearer) or logical channel belongs to a specific QCI (QoS Class Identifier) or slicing. For instance, if the data rate requirement (e.g., Maximum Bit Rate or MBR) is higher than a specific throughput, then it would probably be feasible not to stop the beam management on SCell for a period. The length of this period could be decided by UE implementation, by network (NW) configuration, or a pre-defined fixed one.

In one embodiment, the condition includes if the relative CFRA (Contention-Free Random Access) resources has been allocated for BFR on the SCell.

In one embodiment, the condition includes if the UE speed is below a threshold (e.g., the speed state is under medium speed).

In one embodiment, the condition includes if the active BWP belongs to some specific one (e.g., default BWP).

In one embodiment, the condition includes if there is no multiple-TRP configured for the UE.

The condition for triggering a conditional beam failure recovery may include, but is not limited to, those mentioned above.

In one embodiment, the specific condition also may be whether the BeamFailureRecoveryConfig and/or the random access channel resource is configured for the serving cell/BWP or not. Once the BFR triggering condition is not satisfied, the UE may abort the beam failure recovery for the specific serving cell/BWP, and/or keep the BFI counter and/or BFD timer working. Alternatively, the UE may disable the BFI counter and/or BFD timer once the BFR triggering condition is not satisfied.

In one embodiment, the BFR condition evaluation may take place before starting BFD procedure, that is, gNB may configure the BFR but it is up to UE's status to implicitly enable the BFR relevant operations.

Due to the supporting of beam failure detection on SCell, the UE is configured with sets of reference signals for measurement and detection on each serving SCell. Since the beam corresponding reference signal set are per bandwidth part (BWP) and per serving cell that are configured, the loading and overhead on the reference signaling monitoring increases with the increase of BWPs and serving cells that the UE is configured with. Therefore, the BFD on each BWP and serving cell may be independently activated and/or deactivated by explicit signaling or pre-configured implicit mechanisms. The BFD activation and deactivation mechanism can be also applied based on different deployment scenarios (e.g., operating frequency band). For example, the BFD on PCell and SpCell may apply an implicit mechanism.

Once the UE is configured with carrier aggregation, each of the configured serving SCells may be independently activated and deactivated by the gNB. For the PCell/SpCell, since its carrier(s) is important for control signaling, the PCell/SpCell is always kept activated until the UE leaves the RRC connected state. Hence, the BFD procedure on PCell/SpCell may start directly after the UE is configured with BFD and/or BFR corresponding RRC configurations, such as the RadioLinkMonitoringConfig and/or BeamFailureRecoveryConfig.

It means that the BFI counter may be initiated/reset to zero once these (re)configurations are received and/or before indicating to a lower sublayer to start the beam failure indication transmission and beam failure corresponding reference signal measurement procedure. For the SCells, the RadioLinkMonitoringConfig and/or BeamFailureRecoveryConfig can be configured by gNB before the SCell is activated. Hence, the BFD procedure within the SCell can be activated either along with the SCell being activated, an explicit signaling like a MAC Control Element (MAC CE), or an indication from the lower sublayer where a specific downlink control indicator (DCI) is received.

Moreover, while the SCell is deactivated, the BFI counter and/or BFD timer may be cleared and reset when receiving the activation of the SCell (e.g., it is noted that the configuration of BFD and/or configuration of BFR would be kept regardless of whether the SCell is activated or deactivated.)

Figure 7:
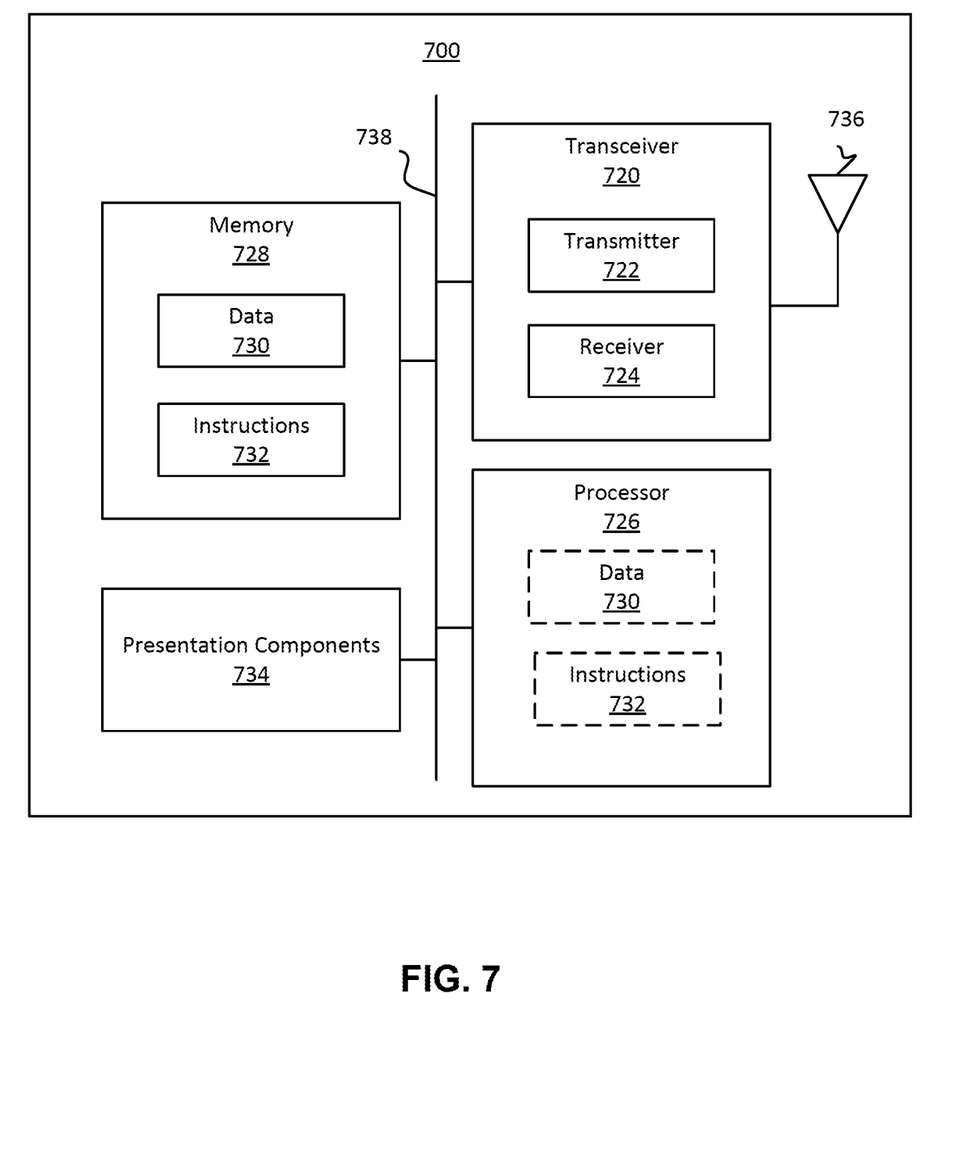
FIG. 7 is a block diagram of a device for wireless communication in accordance with various embodiments of the present disclosure.

FIG. 7 illustrates a block diagram of a device for wireless communication, according to various exemplary embodiments of the present disclosure. As shown in FIG. 7 device 700 may include transceiver 720, processor 726, memory 728, one or more presentation components 734, and at least one antenna 736. Device 700 may also include an RF spectrum band module, a base station communications module, a network communications module, and a system communications management module, input/output (I/O) ports, I/O components, and power supply (not explicitly shown in FIG. 7). Each of these components may be in communication with each other, directly or indirectly, over one or more buses 738.

Transceiver 720 having transmitter 722 and receiver 724 may be configured to transmit and/or receive time and/or frequency resource partitioning information. In some embodiments, transceiver 720 may be configured to transmit in different types of subframes and slots including, but not limited to, usable, non-usable, and flexibly usable subframes and slot formats. Transceiver 720 may be configured to receive data and control channels.

Device 700 may include a variety of computer-readable media. Computer-readable media can be any available media that can be accessed by device 700 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, and magnetic disk storage or other magnetic storage devices. Computer storage media does not comprise a propagated data signal. Communication media typically embodies computer-readable instructions, data structures, program modules, or other data in a modulated data signal, such as a carrier wave, or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 728 may include computer-storage media in the form of volatile and/or non-volatile memory. Memory 728 may be removable, non-removable, or a combination thereof. Exemplary memory includes solid-state memory, hard drives, optical-disc drives, etc. As illustrated in FIG. 7, memory 728 may store computer-readable, computer-executable instructions 732 (e.g., software codes) that are configured to, when executed, cause processor 726 to perform various functions described herein, for example, with reference to FIGS. 1 through 6. Alternatively, instructions 732 may not be directly executable by processor 726 but be configured to cause device 700 (e.g., when compiled and executed) to perform various functions described herein.

Processor 726 may include an intelligent hardware device, e.g., a central processing unit (CPU), a microcontroller, an ASIC, etc. Processor 726 may include memory. Processor 726 may process data 730 and instructions 732 received from memory 728, and information through transceiver 720, the baseband communications module, and/or the network communications module. Processor 726 may also process information to be sent to transceiver 720 for transmission through antenna 736, to the network communications module for transmission to a core network.

One or more presentation components 734 presents data indications to a person or other device. Exemplary one or more presentation components 734 include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain embodiments, a person of ordinary skill in the art would recognize that changes can be made in form and detail without departing from the scope of those concepts. As such, the described embodiments are to be considered in all respects as illustrative and not restrictive. It should also be understood that the present disclosure is not limited to the particular embodiments described above, but many rearrangements, modifications, and substitutions are possible without departing from the scope of the present disclosure.

What is claimed is:

1. A base station (BS) for wireless communication, the BS comprising:
   one or more processors; and
   at least one memory coupled to at least one of the one or more processors, the at least one memory storing one or more computer-executable instructions that, when executed by the at least one of the one or more processors, cause the BS to:
   transmit, to a user equipment (UE), a first radio resource control (RRC) configuration, the first RRC configuration configuring the UE with a radio link monitoring configuration that includes a beam failure detection (BFD) timer and a beam failure indication (BFI) count threshold, the first RRC configuration enabling the UE to:
      start or restart the BFD timer by a medium access control (MAC) entity of the UE each time a BFI is received from a lower layer of the UE,
      count a number of the received BFIs using a BFI counter, and
      initiate a beam failure recovery (BFR) procedure upon determining that a value of the BFI counter is greater than or equal to a value of the BFI count threshold; and
   transmit, to the UE, a second RRC configuration that reconfigures the UE with a second radio link monitoring configuration, the second RRC configuration enabling the UE to set the value of the BFI counter to zero in response to receiving the second RRC configuration.

2. The BS of claim 1, wherein transmitting the second RRC configuration comprises transmitting the second RRC configuration via a downlink RRC message.

3. The BS of claim 1, wherein reconfiguring the UE with the second RRC configuration comprises reconfiguring at least the BFI count threshold.

4. The BS of claim 1, wherein reconfiguring the UE with the second RRC configuration comprises reconfiguring at least the BFD timer.

5. The BS of claim 1, wherein both the first RRC configuration and the second RRC configuration are associated with a specific downlink bandwidth part (BWP).

6. A method performed by a base station (BS) for wireless communication, the method comprising:
   transmitting, to a user equipment (UE), a first radio resource control (RRC) configuration, the first RRC configuration configuring the UE with a radio link monitoring configuration that includes a beam failure detection (BFD) timer and a beam failure indication (BFI) count threshold, the first RRC configuration enabling the UE to:
      start or restart the BFD timer by a medium access control (MAC) entity of the UE each time a BFI is received from a lower layer of the UE,
      count a number of the received BFIs using a BFI counter, and
      initiate a beam failure recovery (BFR) procedure upon determining that a value of the BFI counter is greater than or equal to a value of the BFI count threshold; and
   transmitting, to the UE, a second RRC configuration that reconfigures the UE with a second radio link monitoring configuration, the second RRC configuration enabling the UE to set the value of the BFI counter to zero in response to receiving the second RRC configuration.

7. The method of claim 6, wherein transmitting the second RRC configuration comprises transmitting the second RRC configuration via a downlink RRC message.

8. The method of claim 6, wherein reconfiguring the UE with the second RRC configuration comprises reconfiguring at least the BFI count threshold.

9. The method of claim 6, wherein reconfiguring the UE with the second RRC configuration comprises reconfiguring at least the BFD timer.

10. The method of claim 6, wherein both the first RRC configuration and the second RRC configuration are associated with a specific downlink bandwidth part (BWP).

\* \* \* \* \*